May 1, 1923.

J. C. BAUMAN

ANIMAL TRAP

Filed March 19, 1921

J.C.Bauman

Inventor

By Geo. F. Kimmel, Attorney

May 1, 1923.
J. C. BAUMAN
1,453,615
ANIMAL TRAP
Filed March 19, 1921
2 Sheets-Sheet 2
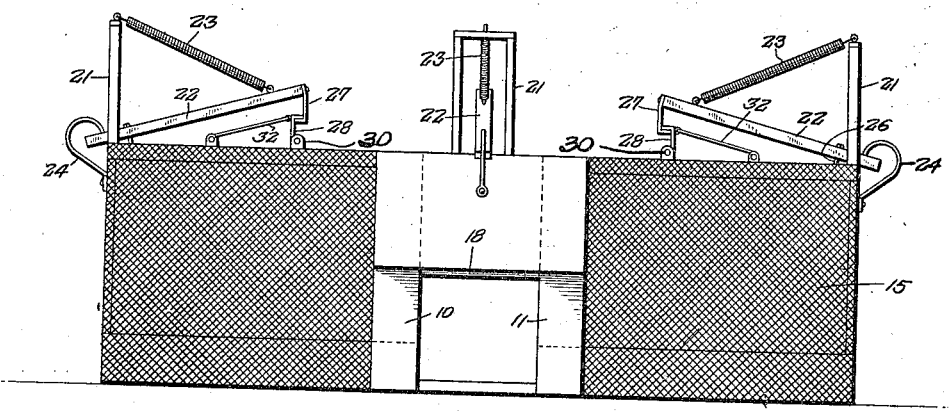
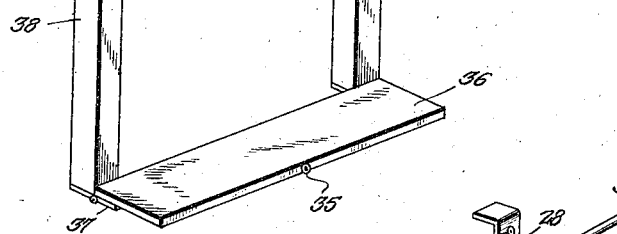
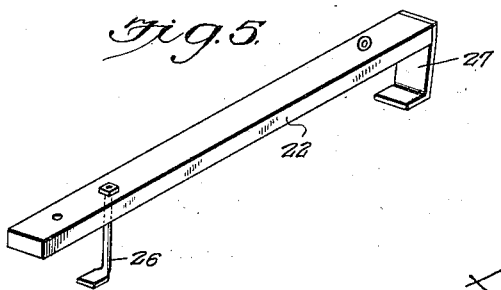
Inventor
J.C.Bauman
By
Geo. P. Kimmel, Attorney Patented May 1, 1923.

1,453,615

UNITED STATES PATENT OFFICE.

JULIUS CLEBERT BAUMAN, OF MILES, TEXAS.

ANIMAL TRAP.

Application filed March 19, 1921. Serial No. 453,766.

*To all whom it may concern:*

Be it known that I, JULIUS CLEBERT BAUMAN, a citizen of the United States, residing at Miles, in the county of Runnels and State of Texas, have invented certain new and useful Improvements in Animal Traps, of which the following is a specification.

This invention relates to animal traps and more particularly to that class of devices for trapping small fur bearing animals and the like in the field or elsewhere without injury or damage to the animal.

The primary object of the invention is the construction of a new and improved animal trap wherein a plurality of separate entrances and compartments are provided for trapping animals and so constructed and arranged to permit the bait to be positioned at a central point with respect to each of the compartments and prevent the animals from obtaining the same.

A still further and important object of the invention resides in a new and improved animal trap of the class above designated wherein the separate entrances and compartments are each provided with an automatic trip device and door which, when actuated will close the compartment and confine the animal therein without effecting the remaining portion of the trap so that each respective compartment may also trap the animals so entering them.

Another and equally important object of the invention is the construction of a new and improved trap which is capable of various modifications and designs to present a plurality of separate and independent compartments, and one which will embody a construction which is extremely simple, consisting of comparatively few parts therefore inexpensive to manufacture, highly efficient in operation and use, strong and durable, and so designed to be made in any size or of such material as may be required for the purpose to which the trap is intended.

With these objects in view and others which will be manifest and suggested as the purpose and nature of my invention are revealed in the following specification and drawing wherein I have shown but one embodiment thereof, Figure 1 is a plan view.

Fig. 3 is an end view showing the door in its raised and set position.

Fig. 4 is a perspective view of a trip board and its trip braces.

Fig. 5 is a view of a trip bar, and

Fig. 6 is a view of a trip rod used in connection with the invention.

Figure 1:
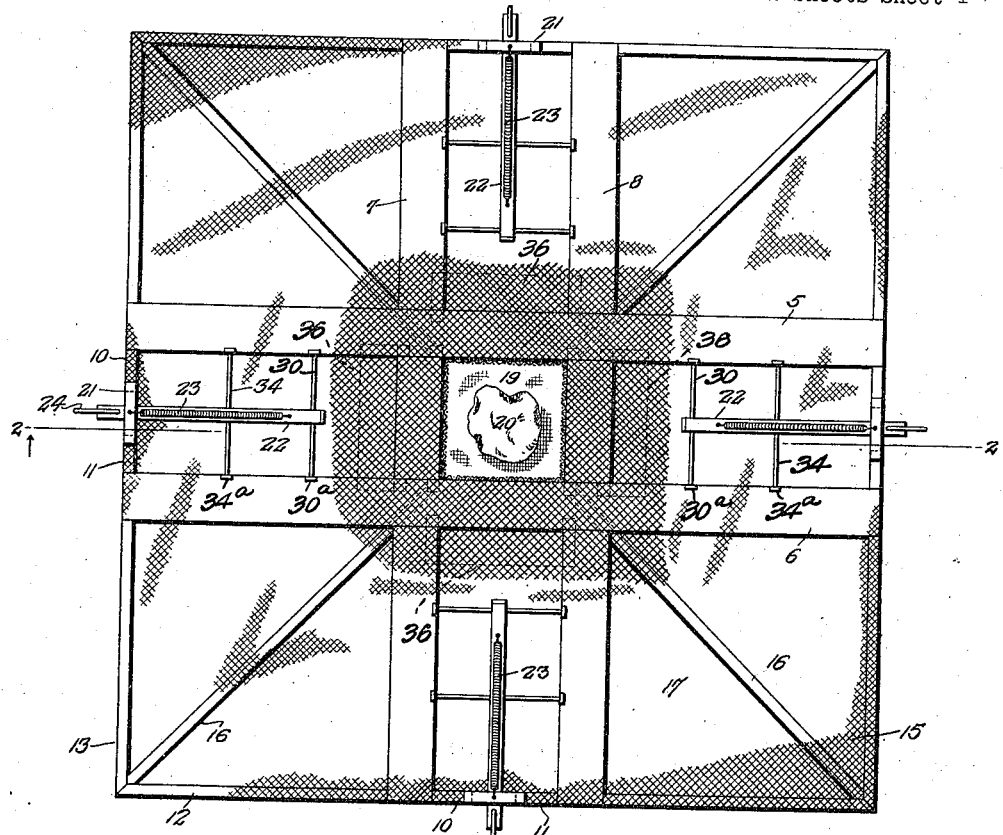

Referring now to the drawing where like parts designate corresponding parts throughout the specification, 5 and 6 designate a pair of parallel frame boards and 7 and 8 a similar pair of boards extending at right angles thereto being similarly arranged in relation to a corresponding frame constituting the bottom frame of the trap. The top and bottom frames, above referred to, are also connected by vertical boards 10, 11 which constitute a doorway or entrance for the compartments subsequently to be referred to.

The respective top and bottom frames of the trap are also connected by substantially narrow connecting boards 12, 13 at their top and bottom, the entire trap with the exception of the doorway being covered by a fine wire mesh 15 as is common to constructions of this type. Diagonal partitions 16 within the trap divide the same into a plurality of substantially rectangular compartments 17, each of which is provided with a separate entrance and automatically operated, vertically slidable door or closure 18, the operation of which will be referred to now in detail.

At the common center 19$^a$ of the trap there is provided an inclosed compartment for receiving the bait designated 20 which as shown may be observed through each of the separate entrances to entice the animal as is readily understood.

Figure 2:
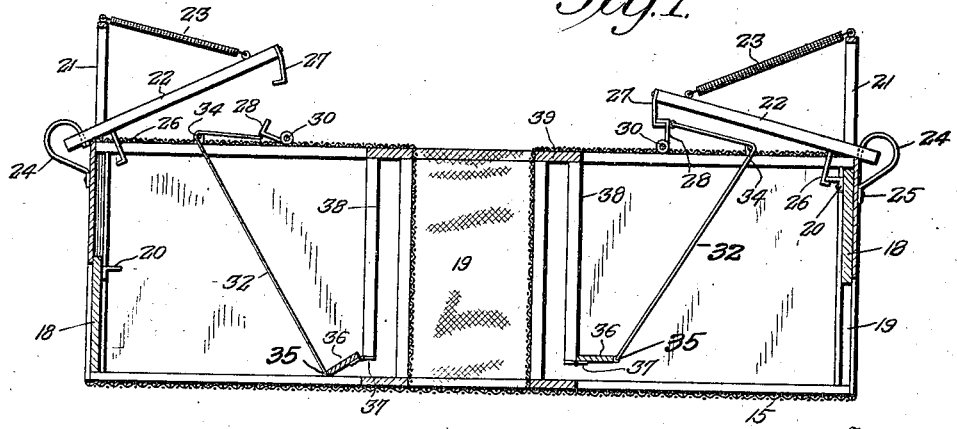
Fig. 2 is a vertical section taken on the line 2—2 of Fig. 1.

It will of course be understood that each slidable door operates independently of the others and therefore it will only be necessary to describe the operation of one of said doors for which purpose attention is particularly directed to Fig. 2 wherein one of the doors is shown in its raised and the other door in its closed, released position. Each door 18 is adapted to slide in a guideway or groove 19 and as shown is provided with an inwardly extending L-shaped hook 20 near its upper end. A vertical standard 21 is connected to a trigger bar 22 by a resilient spring 23, the outer end of said trigger bar 22 being connected to an offset, bent flat spring 24 secured at 25 to one side of the trap. The bar 22 is provided with a depending, catch 26 which in its set position is adapted to engage the L-shaped member 20 as clearly shown in Fig. 2, and thus retain the door in its vertical or raised position. The outer end of the bar 22 carries a bent trigger rod retaining member 27 which engages beneath a similar, inverted member or catch 28 which is secured at 29 in any well known manner to a horizontal trip rod 30 which is free to oscillate in supports 30ª sufficiently to permit the respective members 27, 28 to engage therewith and thus retain the trigger bar 22 in its set position.

An eye 31 formed on the member 28 provides means for connecting one terminal of a flexible element 32 which is trained about a pin or roller 34 mounted in suitable supports 34ª and connected at 35 to a trip board 36 which is hingedly connected at 37 to a pair of vertical trip braces 38 which braces are suspended from a flat connecting trip or board 39 positioned in proximity to the central compartment which receives the bait.

In setting the trap, it will be readily seen that as the door 18 is raised in its guide, the catch 26 may be brought into engagement and beneath the member 20 of said door to hold it in its raised position as the trigger bar 22 is depressed against the resistance of the spring 23. As the end of the trigger bar 22 is lowered, the catch or bent end 27 may be brought into engagement with the element 28 of the trip rod whereby the trip board 36 will be brought to its horizontal operative or set position as shown in the right hand portion of Fig. 2.

From this position, it will be readily recognized that as the animal steps on the trip board 36, the weight of the animal will cause a pull on the flexible element 32 resulting in releasing the elements 27, 28 whereby the trigger bar 22 will fly upward thus releasing the catch 26 from the member 20 carried by the door which will of course fall by gravity and thus close the compartment. The operation of the respective doors are therefore necessarily independent of each other so that in the actual use of the trap, it would be possible to catch an animal in any one or all of the separate compartments in the manner above shown and described.

While I have shown the trap as consisting of but four compartments, it will be readily recognized that the design of the said trap may be altered to suit the need and occasion required depending on the locality in which the trap is to be used.

In the accompanying drawings, I have illustrated my invention embodied in one form by way of example, and which in practice has been found to be highly satisfactory in obtaining the desired results. It will be obvious, however, that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention, what I now claim as new and desire to secure by Letters Patent of the U. S. is:—

1. A trap having an inclosed baiting chamber and a compartment leading thereto, a slidable door for said compartment, a spring controlled trigger bar for retaining said door in its raised, set position, a trip rod operatively engaged with said trigger bar and flexible means for releasing said trigger bar from the trip rod whereby the door is released and falls by gravity to close said compartment.

2. A trap having an inclosed baiting chamber and a compartment leading thereto, a gravity slidable door for said compartment, a spring controlled trigger bar for retaining the said door in its raised, set position, a trip rod operatively engaged with said trigger bar, a hingedly connected trip board within the compartment, and a flexible element connecting the trip rod and trip board whereby the trigger bar is released by the weight of an object on the said board and the door closes by gravity.

3. A trap having an inclosed baiting chamber and a compartment leading thereto, a slidable door for said compartment, a support above said door, a flat spring secured to the side of the cage below the support, a trigger bar having one end attached to said flat spring, a coiled spring connecting said support and trigger bar, a bent catch carried by the opposite end of said trigger bar, a trip rod operatively engaged with said catch, a hingedly connected trip board within the compartment in proximity to the baiting chamber, a flexible element connecting said trip rod and trip board whereby when the trigger bar is released by the weight of an object on said board the door will close by gravity.

In testimony whereof, I affix my signature hereto.

JULIUS CLEBERT BAUMAN.